United States Patent

Monti

[15] 3,640,643
[45] Feb. 8, 1972

[54] HELICOPTER ROTOR CONSTRUCTION
[72] Inventor: Giancarlo Monti, Varese, Italy
[73] Assignee: Siai-Marchetti S.p.A., Varese, Italy
[22] Filed: Dec. 23, 1969
[21] Appl. No.: 887,798

[30] Foreign Application Priority Data
Dec. 24, 1968 Italy....................................25561/68

[52] U.S. Cl..............................................416/136, 416/148
[51] Int. Cl................................................................B64c 27/48
[58] Field of Search................................416/131, 134–136, 416/138, 141, 102, 148

[56] References Cited

UNITED STATES PATENTS

| | | | |
|---|---|---|---|
| 1,973,573 | 9/1934 | Lougheed | 416/134 |
| 2,121,345 | 6/1938 | Hafner | 416/135 X |
| 2,553,193 | 5/1951 | Hodson et al. | 416/135 |
| 2,809,506 | 10/1957 | McDaniel | 416/135 X |
| 3,254,724 | 6/1966 | Brooke | 416/135 X |

FOREIGN PATENTS OR APPLICATIONS

| | | | |
|---|---|---|---|
| 751,109 | 6/1956 | Great Britain | 416/102 |
| 642,206 | 7/1962 | Italy | 416/148 |

*Primary Examiner*—Everette A. Powell, Jr.
*Attorney*—Kurt Kelman

[57] ABSTRACT

A paired blade helicopter rotor having a strut connecting the blades and a tie rod connecting each blade with the rotor hub, provision being made to pretension the tie rods.

7 Claims, 3 Drawing Figures

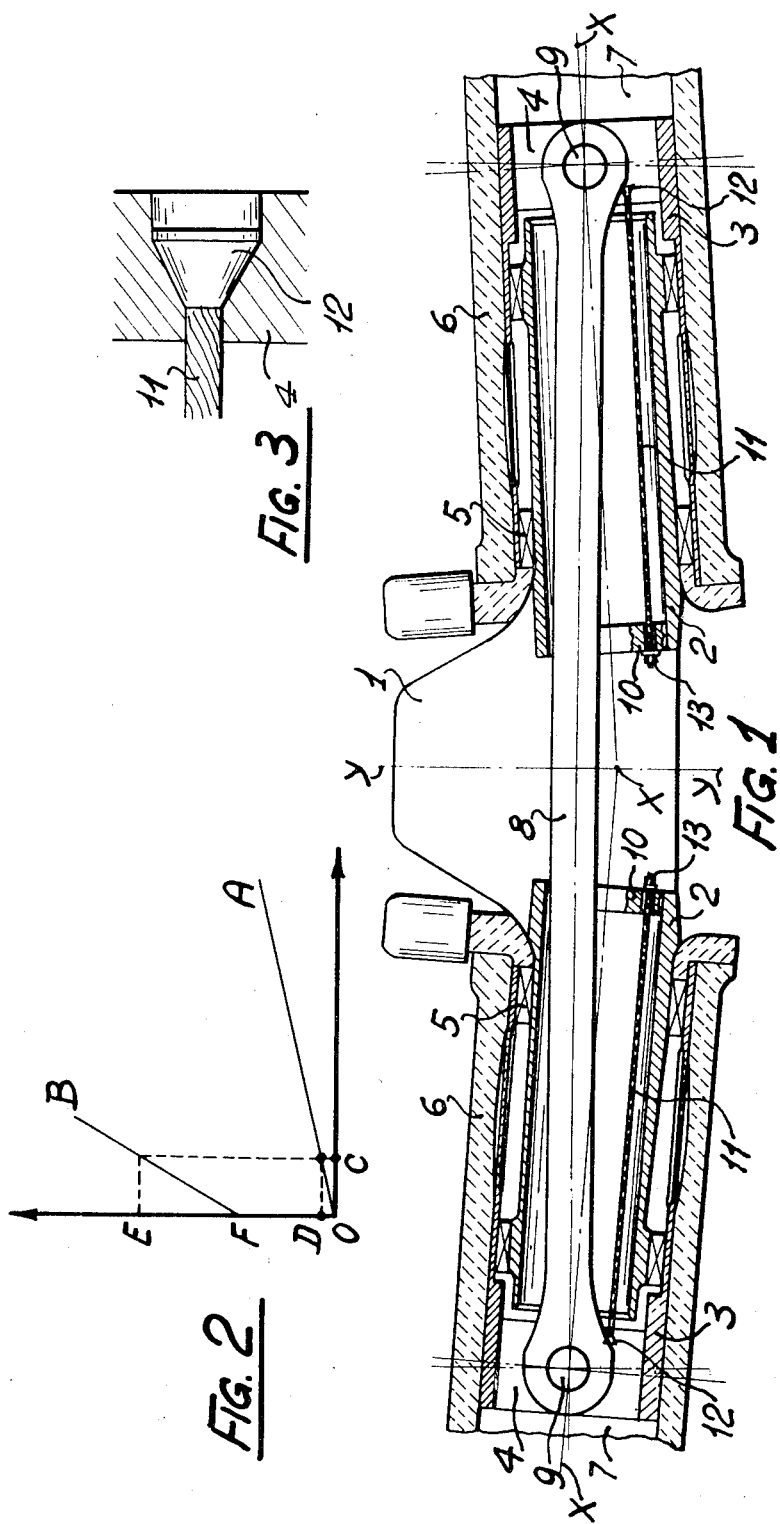

HELICOPTER ROTOR CONSTRUCTION

The present invention relates to helicopter rotor construction and, in particular, to an improved support construction for paired blade helicopter rotors.

Helicopter rotor blades are so mounted that, simultaneous with rotation, they have their pitch feathered and their attitude varied, as required for flight. During flight, the centrifugal action of the rotating blades tends to increase the outward spanwise load or thrust. Should the blades not be properly matched or one be in imbalance with the other, the centrifugal action would create severe vibratory effects detrimental to smooth flight. Consequently, provision must be made to take up the spanwise loads and to compensate for any imbalance in the blades or which might be created by the rotation thereof.

It is an object of the present invention to provide an improved helicopter rotor blade construction in which simple and effective means are provided for compensating for the spanwise movement of the blades under centrifugal rotational effects.

It is another object of this invention to provide a helicopter rotor blade construction which effectively compensates for any imbalance in the blades created or accentuated by the centrifugal action thereof.

It is another object of the invention to provide a helicopter rotor blade assembly having improved support means maintaining the blades in operation under balanced conditions while permitting the simultaneous rotation, feathering, and change in attitude of the blades.

It is a specific object to provide an improved helicopter rotor support assembly of the paired blade variety which provides simple and effective means for overcoming the effect of centrifugal action on the blades and maintaining the blades in centered position.

According to the present invention there is provided a two-blade or paired rotor assembly in which the paired blades are connected by a common strut member which supports the blades in opposed directions under normal balanced loads. Each blade is provided with a tie rod connecting its root to the hub of the rotor. The tie rods are provided with means for pretensioning each so that they may be effective only to support the blades under certain predetermined conditions of imbalance.

In the preferred form, the tie rods are provided with variable adjustment means to effect pretensioning.

The above objects and features of the present invention will become more apparent from the following detailed description of a now pReferred embodiment thereof, taken in conjunction with the accompanying drawing, in which FIG. 1 is a vertical sectional view of a rotor taken along the span axis, showing the construction of the present invention;

FIG. 2 is a graph diagramming the load paced upon the rotor of FIG. 1 when in operation; and FIG. 3 is an enlarged sectional view of one tie rod end fastening.

Turning now to FIG. 1, the helicopter rotor assembly is shown to comprise a central hub or yoke 1 on which is fixed in opposed diametrically extending positions a pair of hollow cylindrical arms 2 having axis X dihedral to each other. Telescoped over each of the arms 2 is cylindrical sleeve 3 having a closed outer end 4. Located between the inner surface of each sleeve 3 and the outer surface of each arm 2 are a plurality of roller bearing units 5 guided within appropriate races formed on their respective surfaces. Each sleeve 3 is thus freely rotatable about the arm 2. Fitted over each sleeve 3 is the root 6 of a blade 7. The root 6 is secured to its respective sleeve 3 by conventional fastening means. Conventional mechanism is provided for feathering each blade about the axis of arm 2, as will be readily understood by those skilled in the art. Consequently, details of well-known structures are omitted in order to maintain the present description in as brief and concise form as possible.

In accordance with the present invention, an elongated unitary strut 8 is fixed at each of its ends 9 to the respective head end 4 of each of the sleeves 3. The fastening 9 may be a conventional wrist pin, preferably located at a point intersecting the longitudinal axis X of the arm 2 so that, as seen in FIG. 1, the strut 8 bridges the rotor hub yoke 1 and is tensioned against the outward movement of the rotor blades by the blades themselves.

Located at the inner end of each of the arms 2 is a washer or annular support 10 having a bore permitting the passage of the strut member 8 therethrough. The washer support 10 is fixed to the inner end of the arm 2 so that it is secure and rigid. It may also be fixed to the rotor hub yoke 1. Disposed between the support 10 and the outward head 4 of the blade sleeve 3 is a tie rod 11. The tie rod 11 is preferably formed of a wire rope, cable or other braided material and is fastened to the outward head 4 by a cable terminal 12 (FIG. 3) and at its other end to the support 10 by a screw-nut fastener 13 in order to permit the tie rod to be preloaded with a predetermined tension. Preferably, the tie rod is located close to the wall of the arm 2 radially spaced from the axis X but parallel thereto.

The illustrated device forms a rotor hub which supports a pair of blades 7 on a pair of opposed feather bearings. The blades are interconnected by a single-unitary elongated linear strut 8 which secures the blades span wise on the bearing arms 2. The strut 8 is preferably made of laminated metal strip, flexible strap, wire braid or similar material which may be easily twisted but which has a high-tensile strength. Since the strut 8 spans the entire hub assembly and is not secured to the yoke 1, torsion stress and strain on the strut is minimal. Consequently, the strut is neither unduly affected by or unduly affects the feathering of the blade. The preloaded tensioned tie rod 11, being secured at each of its ends 12 and 13 separately from the strut 8, does not interfere with it during the oscillation or alternate change of the pitch of each blade. Preferably, the preloaded tension on the tie rod 11 should be less than that in the strut 8 so as to have practically no influence in normally supporting the blades against any centrifugal load. The tension in the tie rod 11 should, however, be sufficient so as to react against any shifting from a normal or balanced position, spanwise along the axis of the supporting bearing arm 2 from a load in excess of the normal.

Thus, the structure of the invention functions so that, when a trend is created in the rotating blades to shift the blades to shift the blades spanwise from a balanced or neutral position, the preloaded tension rod or tie rod 11 reacts, not in proportion to the total centrifugal force to which the blade is subjected, but only to that fractional amount caused by the imbalance. That is, substantially all centrifugal load is, in fact, taken up by the common strut 8 and only the excess of the unbalanced load is transmitted to the tie rod 11. This excess is usually very low relative to the entire load on the rotor and is, therefore, easily compensated by the simple construction shown. The centering action is exerting by the preloaded tie rod without interfering with the load on the blades and/or the ability of the blades to be feathered about the feathering bearing arm, even if in unbalance condition.

Since the tie rod 11 is a wirelike element, it has great torsional flexibility, and since it is spaced radially from the longitudinal axis of the bearing support arm, it undergoes only a moderate twisting as the blade is feathered. Consequently, the feathering of the blade exerts little stress upon the tie rod and likewise the tie rod exerts little influence upon the feathering of the blade.

The advantages of the present invention can be seen in FIG. 2. In this graph, the horizontal line represents spanwise movement of the member and the vertical line represents the tension loaded on the strut 8 and the tie rod 11. The curve A represents the load caused by spanwise shifting under centrifugal action of the blade 7; the curve B represents the elastic nature of the pretensioned tie rod 11; the segment OC represents the amount of spanwise shifting of the blade caused by an unbalanced load; the segment OD represents the unbalancing load caused by the actual amount of shifting OC; the segment OF represents the preloading applied to the tie rod 11; and the segment OE represents the reaction due to the elastic deformation of the tie rod 11 owing to the amount of shift OC.

While the rotor is rotating without any imbalance, the centrifugal load of the blade is wholly supported by the strut 8 and there is no stress placed upon the hub yoke 1 due to the centrifugal rotation of the blades. Both blades are thus kept centered in respect of the rotor axis Y—Y (FIG. 1).

In the case where one blade becomes unbalanced with respect to the other, the device operates to stabilize itself. As the hub 1 tends to shift, under the imbalance, from its axis Y—Y, as for example by an amount OC, a nonsymmetrical load OD is created on the tensioned strut 8. At this point, should the tie rod 11 come into play and be stretched by the amount OC, an elastic reaction EF would occur which would over compensate for the imbalance. The tie rod, however, as previously explained, is pretensioned to react only to a predetermined degree of imbalance and so can be preloaded to defer its reaction until the imbalance of the load reaches, for example, the prestressed value OF.

The ability to preload the tie rod 11 by the screw fastener 13 has another advantage in that built-in imbalances, as occur in the manufacturing process or from environmental conditions, such as humidity, insect indigestion etc., can be precompensated and preprogrammed.

While only one tie rod 11 is shown associated with each blade, it is possible to employ two or more of them, each preloaded or prestressed with a different tension. In this manner, operating and safety requirements of many different degrees may be taken into account.

From the foregoing numerous advantages are found. Firstly, each blade is secured to the other by a common strut which absorbs the major portion of the centrifugal load. Simultaneously, each blade is secured to the rotor hub for stability, security and balanced operation. Each of the struts and tie rods securing the blade undergoes only limited torsional twisting and consequently may be of light weight material. Furthermore, the oscillation of the blades creates only a minimum twist.

Above all, the interaction of the strut 8 and the tie rods 11 maintain the spanwise shifting of the rotor blades at a virtual minimum during flight and, even at high speed, the blades are kept in substantial balance and properly centered in respect to the axis of rotation. Significantly, all conditions causing imbalance inherent in the rotor can be compensated for before the vehicle and rotor is placed in operation so that the rotor can be said to be statically balanced even before flight.

A number of modifications have been suggested. Many more changes will become readily apparent to those skilled in this art. Consequently, it is intended that the present disclosure be taken as illustrative only of the present invention and that it be limited only by the appended claims.

I claim:

1. A two-bladed rotor assembly for use in a helicopter, comprising a central hub, a pair of bearing arms extending from said hub in opposed directions, a pair of blades each having a root rotatably mounted on each of said arms for feathering thereabout and for spanwise movement in respect thereof, an elongated strut secured at one end to the root of one blade and at its other end to the root of the other blade to support said blades in opposed balanced condition with respect to said hub, and a pair of tie rods each respectively connected to the root of one blade and to said hub, each tie rod being pretensioned to support said blades only under unbalanced conditions.

2. The assembly according to claim 1, wherein said tie rod is pretensioned along the spanwise direction of said blade and inwardly toward said hub.

3. The assembly according to claim 2, including at least one additional tie rod associated with each blade whereby each tie rod may be differently pretensioned to be effective under predetermined unbalance conditions.

4. The assembly according to claim 2, wherein said tie rod is provided with means for varying the tension thereof so that a predetermined tension may be obtained.

5. The assembly according to claim 4, wherein said tension varying means comprises a screw-nut fastener for securing said tie rod to said hub.

6. The assembly according to claim 5, wherein said tie rod comprises a flexible wire.

7. The assembly according to claim 1, wherein said strut comprises a laminate of metal members.

* * * * *